(12) United States Patent
Roy (10) Patent No.: US 11,145,198 B2
(45) Date of Patent: Oct. 12, 2021

(54) PREDICTIVE TRAFFIC MANAGEMENT SYSTEM

(71) Applicant: Prannoy Roy, New Delhi (IN)

(72) Inventor: Prannoy Roy, New Delhi (IN)

( * ) Notice: Subject to any disclaimer, the term of this patent is extended or adjusted under 35 U.S.C. 154(b) by 0 days.

(21) Appl. No.: 16/604,432

(22) PCT Filed: Sep. 26, 2017

(86) PCT No.: PCT/IB2017/055846
§ 371 (c)(1),
(2) Date: Oct. 10, 2019

(87) PCT Pub. No.: WO2018/224872
PCT Pub. Date: Dec. 13, 2018

(65) Prior Publication Data
US 2020/0152057 A1 May 14, 2020

(30) Foreign Application Priority Data

Jun. 9, 2017 (IN) .............................. 201711020313
Jun. 23, 2017 (IN) .............................. 201711022165

(51) Int. Cl.
*G08G 1/01* (2006.01)
*G08G 1/095* (2006.01)

(52) U.S. Cl.
CPC ......... *G08G 1/0145* (2013.01); *G08G 1/0112* (2013.01); *G08G 1/0133* (2013.01); *G08G 1/095* (2013.01)

(58) Field of Classification Search
CPC .... G08G 1/0112; G08G 1/012; G08G 1/0133; G08G 1/0145; G08G 1/04; G08G 1/095; G08G 1/096811
See application file for complete search history.

(56) References Cited

U.S. PATENT DOCUMENTS 6,317,058 B1 * 11/2001 Lemelson ................ G08G 1/07
340/910
2008/0094250 A1 * 4/2008 Myr .......................... G08G 1/04
340/909
(Continued)

FOREIGN PATENT DOCUMENTS

CN        104715610 A    6/2015
CN        106548633 A    3/2017
(Continued)

OTHER PUBLICATIONS

"The cost of traffic jams", The Economist explains.
(Continued)

*Primary Examiner* — Sisay Yacob
(74) *Attorney, Agent, or Firm* — BakerHostetler (57) ABSTRACT

A traffic control method and system that interfaces to all available traffic control systems (401), which include all manner of existing traffic control systems and new traffic control systems, extends the scope and capabilities the real-time monitoring of traffic characteristics (402) and utilizes artificial intelligence techniques to predict and/or detect traffic congestion (403), as well as to determine corrective actions (404) to be performed by relevant available mechanisms. These corrective actions are then caused to occur by providing appropriate data and instructions to the selected mechanisms and systems using compatible interfaces provided for this purpose.

21 Claims, 6 Drawing Sheets

(56) References Cited

U.S. PATENT DOCUMENTS

| | | | | |
|---|---|---|---|---|
| 2012/0068858 | A1* | 3/2012 | Fredkin | G08G 1/166 340/902 |
| 2012/0274481 | A1* | 11/2012 | Ginsberg | G08G 1/096883 340/905 |
| 2014/0222321 | A1* | 8/2014 | Petty | G01C 21/3492 701/117 |
| 2018/0089994 | A1* | 3/2018 | Dhondse | G08G 1/0145 |

FOREIGN PATENT DOCUMENTS

| | | |
|---|---|---|
| EP | 1 938 296 A2 | 7/2008 |
| WO | 2007/103180 A2 | 9/2007 |

OTHER PUBLICATIONS

Guo, et al., "Routing Multiple Vehicles Cooperatively: Minimizing Road Network Breakdown Probability", IEEE Transactions on Emerging Topics in Computational Intelligence, vol. 1, No. 2, Apr. 2017.

Guerrini, "Traffic Congestion Costs Americans $124 Billion a Year, Report Says".

"New research finds link between air pollution and traffic accidents".

Currie, et al., "Traffic Congestion and Infant Health: Evidence from E-ZPass", NBER Working Paper No. 15413 Oct. 2009.

Smith, et al., "SURTRAC: Scalable Urban Traffic Control".

Katwijk, et al., "Look-ahead traffic adaptive control of a single intersection—A taxonomy and a new hybrid algorithm".

Astarita, et al., "The Use of Adaptive Traffic Signal Systems Based on Floating Car Data", Wireless Communications and Mobile Computing, vol. 2017, Article ID 4617451.

Hu, et al., "SmartRoad: Smartphone-Based Crowd Sensing for Traffic Regulator Detection and Identification", ACM Transactions on Sensor Networks, vol. 11, No. 4, Article 55, Jul. 2015.

Greene, "Tracking Traffic with Cell Phones".

Xu, et al., "Multiagent Based Decentralized Traffic Light Control for Large Urban Transportation System", vol. 2014, Article ID 104349.

Bazzan, "Introduction to Intelligent Systems in Traffic and Transportation", Dec. 2013.

* cited by examiner

PREDICTIVE TRAFFIC MANAGEMENT SYSTEM

CROSS-REFERENCE TO RELATED APPLICATIONS

This application is a National Stage of International patent application PCT/IB2017/055846, filed on Sep. 26, 2017, which claims priority to foreign Indian patent application No. IN 201711020313, filed on Jun. 9, 2017, and Indian patent application No. IN 201711022165, filed Jun. 23, 2017, the disclosures of which are incorporated by reference in their entireties.

TECHNICAL FIELD

This disclosure relates to a system for providing vehicular traffic management. In particular, the disclosure pertains to the optimization of vehicular traffic flow across a defined region.

BACKGROUND

Almost all modern cities and urban centers are plagued by considerable problems relating to vehicular traffic congestion. These problems result in huge losses in terms of lost productive time on account of delays in travelling from one point to another. One estimate of financial impact of this phenomenon is given in a report published by The Economist in an article titled "The Cost of Traffic Jams" published in November 2014, cites data provided by a London based consultancy and INRIX (a traffic-data firm), estimating the impact of such delays on the British, French, German and American economies at U$200 billion. Another estimate provided by an article ("Routing Multiple Vehicles Cooperatively: Minimizing Road Network Breakdown Probability") published in the IEEE Transactions on Emerging Topics in Computational Intelligence in February 2017 puts the estimated financial cost at U$2,200 billion per year in developed countries worldwide. Another article titled "Traffic Congestion Costs Americans $124 Billion a Year, Report Says" and published on 14 Oct. 2014 in Forbes magazine states similar large value of economic costs. These assessments are clearly indicative of a widespread recognition of the enormous magnitude of the harmful consequences of this problem.

In addition to the fiscal impact there is a significant adverse effect on human health that arises on account of physical stress and frustration caused by such conditions. Aggravated conditions can lead to incidents of road rage which can pose serious threats to life and property. Pollution related health issues can create additional negative influences on quality of life for people directly involved in the use of vehicular transportation as well as those living in the vicinity of pronounced traffic congestion. A working paper titled "New research finds link between Air Pollution and Traffic Accidents" published by the Grantham Research Institute on Climate Change and the Environment on 3 Oct. 2016 on the London School of Economics website provides scientific data on this issue. Similarly, an article titled "Traffic Congestion and Infant Health: Evidence from E-ZPass" authored by Janet Currie and Reed Walker, published in the American Economic Journal in January 2011 provided quantified evidence of the impact on health issues on account of Air Pollution caused by Traffic Congestion.

Traffic control is aimed at minimizing traffic congestion and is implemented primarily by regulation of traffic movement at intersections. The early systems were regulated manually but these were largely replaced by automatic traffic lights operating on fixed timing sequences. Such "Automatic Traffic Control Systems" have been in use for a considerable period and have helped in alleviating the burden of manual traffic control. Improvements were introduced in these systems by offset-synchronizing the operation of traffic signals occurring sequentially along a major route in a staggered manner to promote a "green wave" of continuously moving traffic. These "Progressive" Control Systems have also been in use for a long time. Both these systems are oblivious to actual traffic conditions existing at the intersection and are programmed to operate on the basis of "expected" conditions that are derived from traffic data observed over a period of time. However, the rapid increase in the volume of traffic has rendered both types of systems inadequate and even counter-productive under certain situations.

The inadequacies of the Automatic and Progressive Traffic Control systems have resulted in the development and deployment of "Adaptive Traffic Control Systems" that actively sense the traffic conditions in the vicinity of the intersection and adjust the traffic light timings accordingly. These systems form the existing technology platforms that are currently deployed in most modern cities. Various sensors are in use with the most common being "Inductive Loop" sensors embedded in the road upstream of the intersection to detect the presence and movement of vehicles. Video, radar and ultrasonic sensors are some of the other types of sensors that are deployed.

Some of the Adaptive Traffic Control Systems adopt a "Central" control approach where the signals from a number of traffic intersections are fed to a central control unit which determines the timing sequences for each intersection. Such systems are often termed as Vehicle-Actuated Coordinated Junctions systems (VACJ). The control function is implemented across all or multiple intersections from a central or hierarchical structure. One example of this approach is the SCOOT (Split, Cycle, and Offset Optimization Technique) system which is in widespread use today and utilizes binary signals from the embedded inductive loop sensors at intersections from a central computer system. Another such system SCATS (Sydney Co-ordinated Adaptive Traffic System), on the other hand, is a hierarchical and distributed system that uses incremental feedback from the inductive loop sensors located at the STOP-Line at each intersection. Similarly, UTOPIA (Urban Traffic OPtimization by Integrated Automation) is another VACJ type hierarchical system using decentralized control which uses loop detectors which are just downstream of the previous intersection to obtain information on vehicle. This allows it to take into consideration neighboring intersections for enabling dynamic coordinated control. It employs a 3-level hierarchy—Low-level for intersection level monitoring, Area Level which monitors a group of intersections, and Town-level which integrates UTOPIA with other systems such as bus travel times to provide a macroscopic model. RHODES (Real-time Hierarchical Optimized Distributed and Effective System) is another system that uses 3-tiered Hierarchy, similar to UTOPIA but is based on predicted platoon (groups of vehicles travelling together) arrival patterns at the intersection to determine traffic signal timings. Prodyn is yet another decentralized control based system that also makes use of detector information from adjacent intersections and information progresses from intersection to intersection with decreasing weight.

On the other hand, Vehicle-Actuated Isolated Junction systems (VAIJ) systems such as MOVA (Microprocessor Optimized Vehicle Actuated) focus only on individual traffic intersections to provide even more focused control. The individual intersections operate as individual islands that exchange information with adjacent intersection controllers but function independently of one another. As many as 3000 MOVA systems were in use in the UK as of 2011. SURTRAC is another such system details of which are available in the article "SURTRAC: Scalable Urban Traffic Control" published in the Carnegie Mellon University Research Showcase of the School of Computer Science in January 2013. Similar systems are proposed in "Multiagent Based Decentralized Traffic Light Control for Large Urban Transportation System" published in Mathematical Problems in Engineering Article ID 104349, as well as in "Look-Ahead Traffic Adaptive Control of a Single Intersection—A Taxonomy and a new Hybrid Algorithm" a Technical Report 06-039 published by the Delft University of Technology. Such systems are viewed collections of "Intelligent Agents" managing individual traffic intersections.

In all the above systems, regardless of type, all sensing activity is performed in the vicinity of the intersection and the entire "focus" of all the above solutions is on the intersections. Traffic behavior at points distant from the intersection is ignored traffic congestion phenomena at such locations are expected to be resolved by the actions performed at the intersections. This fundamental approach defines the basic limitations of all such systems.

The growing intensity and global impact of the traffic congestion problem has spurred a great deal of research in this area and many groups, organizations and entities are actively engaged in conducting studies and developing improved solutions. These efforts have established that traffic conditions at any given location are often the result of a much wider distribution of traffic behavior at several other connected locations. The size of this "neighborhood" can vary widely and dynamically and may even span an area of several square kilometers that encompasses a multitude of traffic intersections. The traffic behavior in the large expanses between intersection has a very significant on the overall traffic congestion phenomenon. As a result, it is imperative to obtain both a global view and local information by monitoring traffic conditions across the entire area of traffic movement. A set of "emerging" technologies are becoming available to achieve this objective.

The Emerging Traffic Control solutions address the monitoring issue by one of 2 methods. The first method involves the deployment of Floating Car Data (FCD) which utilizes. Book "Introduction to intelligent Systems in Traffic and Transportation" authored by Ana L. C. Bazzan and Franziska Klugl, and published by Morgan & Claypool Publishers describes such systems as so-called probe vehicles that "float" in the traffic stream and provide traffic flow information through wireless transmission of traffic parameters at their respective locations in real-time. In some implementations, these are special vehicles such as taxis or trucks dedicated to delivery and other commercial purposes. So far, this type of FCD has been found to be of limited use since (i) they do not cover the whole network and (ii) are not fully representative due to their relatively low speeds. In Stuttgart, for instance, a fleet of approximately 700 taxis (data from 2003) circulate with GPS device that send its position and speed to a control center approximately every 30 s. Similarly, Research article: The Use of Adaptive Traffic Signal Systems Based on Floating Car Data" authored by Vittorio Astarita, Vincenzo Pasquale Giofre, Giuseppe Guido and Alessandro Vitale, published in Wireless Communications and mobile Computing Volume 2017 (Article ID: 4617451) provides valuable insights on this emerging technology.

The second method achieves the same result more effectively by crowd-sourcing the same data using the ubiquitous personal mobile phones of the occupants of the vehicles in the traffic stream or from in-vehicle systems (in the case of vehicles that are equipped with such systems) that provide such information. While this method carries the threat of "privacy violation" issues it is emerging as a viable solutions as the privacy issues are getting resolved. European Patent No. EP 1938296 B1 titled "Assessing Road Traffic Conditions using Data from Mobile Data Source" describes such as system. Similarly, technical Article "SmartRoad: Smartphone-Based Crowd Sensing for Traffic Regulator Detection and Identification" published in ACM Transactions on Sensor Networks, Vol. 11, No. 4, Article 55 published in July 2015 provides useful information on this technology. "Tracking Traffic with Cell Phones" published on 11 Nov. 2008 in MIT Technology Review describes a research project implemented by the University of California, Berkeley that verified the usefulness of this technique.

The above-mentioned crowd-sourcing based traffic monitoring techniques may be implemented using vehicle-occupant based data collection methods (such as mobile phones) or as in-vehicle features that do not rely on the occupants. The information provided by either of the methods may also be either directly communicated from the vehicle to external elements in the infrastructure (termed as Vehicle to Infrastructure—"V2I" systems) or as information exchanged between vehicles or relayed through a chain of vehicles to an external receiver (termed as Vehicle to Vehicle—"V2V" systems). The general categorization covering both types is termed "V2x".

While these Emerging Technology approaches are able to address the monitoring issues across the entire area of traffic movement they do have certain limitations that restrict their effectiveness. In particular, the following:

1) a very limited ability to recognize the "Traffic mix" (i.e. heterogenous composition of vehicle types)—to distinguish between 2-wheelers, 3-wheelers, cars, trucks, public transport (especially when it has low-occupancy), tractors, horse-carts etc. This limitation is accentuated during actual congestion when all the types of vehicles move at the same slow speed. Since the traffic-mix is an important factor in influencing congestion, this is a significant limitation that is also present in the previous "Adaptive" and "progressive/ Automatic" systems.

2) an inability to detect unexpected events and conditions that are potential traffic congestion creators but arise when traffic is either absent or very low density (for example during hours of the night or early morning when traffic is generally scarce or absent). Such events include events such as vehicle breakdowns, accidents or natural obstructions (tree falling, etc.). Such occurrences are not detected until congestion has occurred and therefore prevention of the congestion is not possible.

These emerging systems are designed as independent systems operating independently of existing systems and intended to replace them. As a result, the implementation of such solutions is generally an expensive proposition.

The proposed solution augments the effectiveness of the existing solutions and enables the prevention of traffic congestion for the most part and more efficient management of inescapable traffic congestion incidents. This improvement is brought about cost-effectively by avoiding the need for replacing existing solutions.

SUMMARY

The proposed solution inexpensively retrofits the existing traffic control systems in the defined area with an interface to an additional control layer that synergistically combines the operation of these resources with the help additional resources that augment the system capabilities by overcoming the limitations of the existing systems described above. The solution implements monitoring of traffic characteristics across entire area of interest. The additional control layer analyses the monitoring data in real-time utilizing artificial intelligence techniques, including Reinforced Learning and heuristic methods to predict the location and causes of situations that are likely to develop or create traffic congestion as well as potential avoidable traffic delay situations. Additional artificial intelligence techniques are used to determine the actions necessary to prevent these situations from developing further based on the known locations and capabilities of the available traffic regulating mechanisms. Finally, the relevant existing traffic regulation mechanisms are caused to perform the determined actions using the retrofitted interfaces.

This arrangement also makes it possible for the proposed system to enhance its effectiveness by obtaining data on travel requirements and journey end-points from users who opt to subscribe to a travel scheduling and route guidance facility that is based on actual traffic control data.

BRIEF DESCRIPTION OF THE DRAWINGS

These and other features, aspects, and advantages of the present disclosure will be better understood when the following detailed description is read with reference to the accompanying drawings in which like characters represent like components throughout the drawings, wherein.

DESCRIPTION

For following description is provided only for purposes of explanation of certain aspects, advantages, and novel features of the disclosure. It is to be understood that not all the advantages of the disclosure may be achieved in accordance with any one particular embodiment of the disclosure. Thus, the present disclosure may be implemented in a manner that achieves or optimizes one advantage or group of advantages without necessarily achieving other advantages.

It will also be readily apparent to those skilled in the art that the disclosure is not limited to the particular embodiments disclosed here and may be embodied in many different forms. The embodiments and description used in the disclosure is not intended to be limiting.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

It is apparent to a person skilled in the art that the exemplified structure may also comprise other functions and structures. It should be appreciated that the functions, structures, elements and the protocols used in communication are irrelevant to the present disclosure. Therefore, they need not be discussed in detail here.

All units described include the software and/or hardware components required for the unit to function. Further, each unit may comprise within itself one or more components which are implicitly understood. These components may be operatively coupled to each other and be configured to communicate with each other to perform the function of the said unit.

It will be apparent to those having ordinary skill in this art that various modifications and variations may be made to the embodiments disclosed herein, consistent with the present disclosure, without departing from its spirit and scope.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The following definitions apply in the context of the present disclosure:

1) A mechanism is any device or arrangement of devices or any functional behavior that produces an intended result. A mechanism may be implemented as hardware, software or any combination of hardware and software.
2) Traffic Monitoring is any set of activities that obtains real-time data on specified traffic characteristics and parameters at a defined set of one or more locations or across a defined area. The activities can employ any sensory mechanism or combination of sensory mechanisms. Preferred include video and image based monitoring, and monitoring based on collective data obtained from GPS-based sensors and non-GPS mobile phone based sensors located in individual vehicles and capable of reporting vehicle location, speed and direction of motion.

3) A traffic regulation mechanism is any device or arrangement of devices operating centrally or in a distributed implementation to regulate traffic flow at one or more traffic intersections—whether operating as an "Intelligent Agent" or as part of a hierarchical or centrally-controlled arrangement such as SCOOT, SCATA, UTOPIA, RHODES or any other.

4) A traffic monitoring mechanism is any mechanism that performs Traffic Monitoring.

5) A traffic guidance mechanism is any mechanism that provides information to vehicles or drivers of vehicles for facilitating their journey and/or improving traffic conditions—such mechanisms are not limited to functioning only at traffic intersections and include Variable Message Displays, as well as Speech/Text Messages or alerts delivered through mobile phones and/or in-vehicle devices. Preferred embodiments of such traffic guidance mechanisms include smartphone-based "Apps" (and similar applications installed in in-vehicle systems) which provide interfaces for obtaining travel requirement details from a registered user and provide audio/video/textual guidance instructions.

6) A computing mechanism is any computing hardware, software or any combination thereof.

7) An analytical engine is any computing mechanism that analyzes input data for determining characteristics of interest for a specified application. The data may pertain to images, streaming video, text, sound or voice, or any other form of data.

8) An evaluation engine is any computing mechanism that determines the actions required for achieving a desired result.

9) A supervisory system is any computing mechanism that monitors other mechanisms that form part of a system and influences their behavior in accordance with defined rules and requirements.

Figure 1:
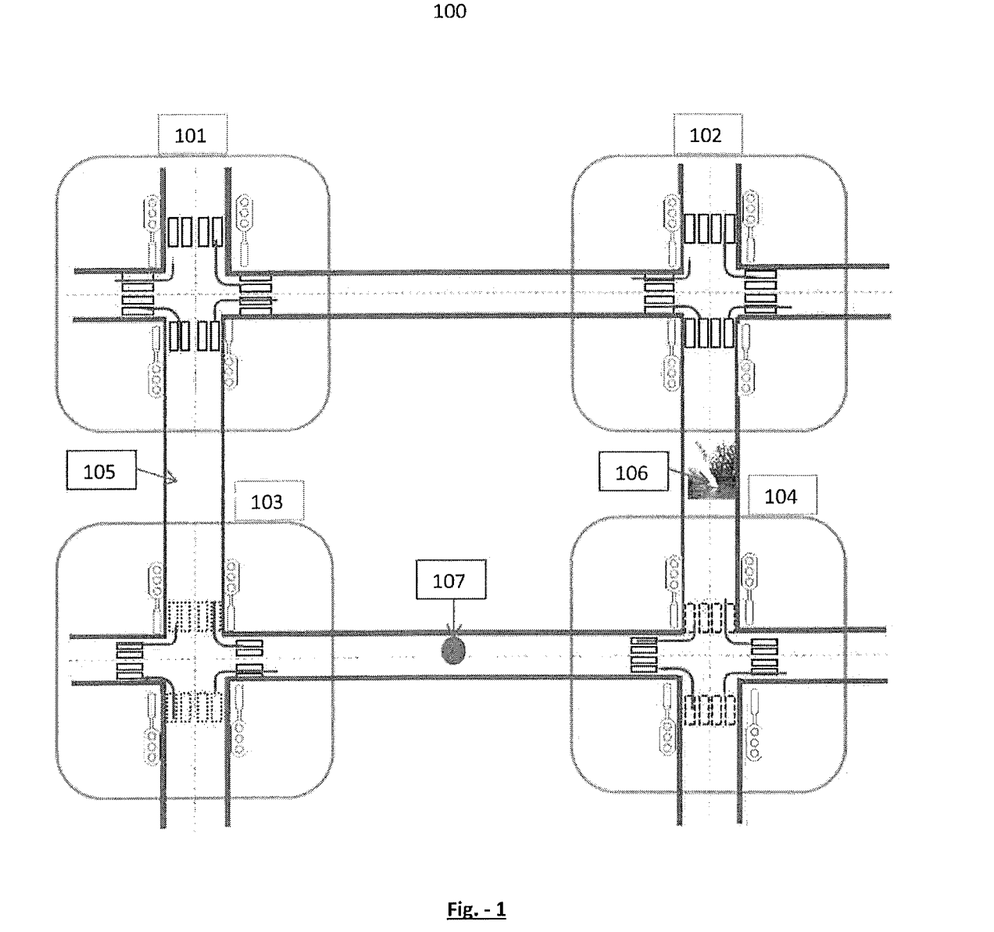
FIG. 1 depicts the limitation of the current state of art by means of examples of traffic congestion causes that remain undetected until traffic congestion has occurred.

FIG. 1 shows a basic schematic diagram of a traffic network according to existing technology comprising a set of traffic intersections connected by interlinking roads. The boundaries drawn around each intersection define the area that is monitored by the traffic control mechanisms installed there. Incidents that occur outside these boundaries are not visible to the sensors in the system. In particular, if the incidents occur at a time when there is very little or no traffic on the road then FCD based systems and Crowd-sourced data systems, such as mobile phone based systems, also fail to sense such occurrences until traffic congestion actually sets in. None of the existing solutions are therefore able to prevent congestion in such cases. A road accident or vehicle breakdown (105) happening early in the morning when traffic was absent, or a water main burst (106), or abandoned construction work (107) are examples of such situations. These examples highlight the limitations of current systems.

Figure 2:
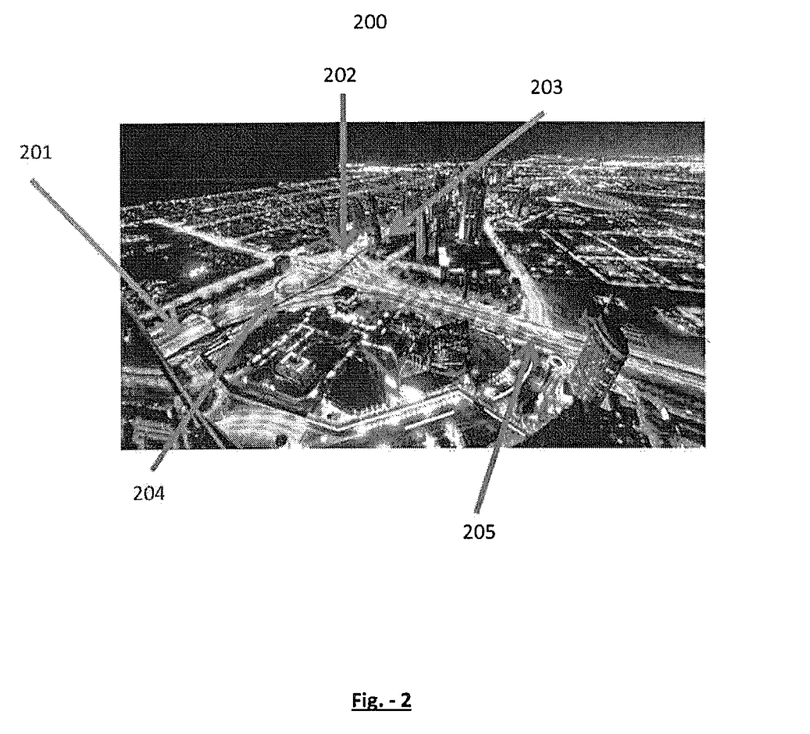
FIG. 2 depicts the "Sky view" feature provided by the present disclosure which captures details of the traffic composition and flow not available with the state of art.

FIG. 2 shows an implementation according to one embodiment of the proposed solution in a form of a night-time aerial view (200). This "Eye in The Sky" approach provides a complete area view and is makes use of both existing sensory arrangements including crowd-sourced data as well as aerial views to provide continuous and complete information on traffic conditions at all points in the entire area. The system can simultaneously view congested traffic areas (202) and (204) as well as sources of the congestion (203) and (201) respectively. At the same time, it can also predict the occurrence of traffic congestion by identifying potential or "developing" areas that have not yet become congested, as exemplified by (205). The prediction is performed by using an appropriate combination of known techniques including Artificial Intelligence techniques, such as Reinforced Learning, Heuristic methods and formal procedures to analyse the monitoring data. Further processing using is implemented on the results of the analysis by deploying a suitable combination of known techniques including Artificial Intelligence techniques, such as Reinforced Learning, Heuristic methods and formal procedures to determine the actions to be performed by one or more of the available existing and/or additional control mechanisms. These actions are then put into effect by providing inputs/instructions to the selected control/guidance mechanisms using interfaces provided.

Figure 3A:
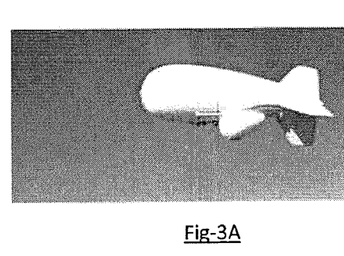
FIG. 3 depicts some preferred embodiments of the unmanned aerial platform used for implementing the proposed solution.
Figure 3B:
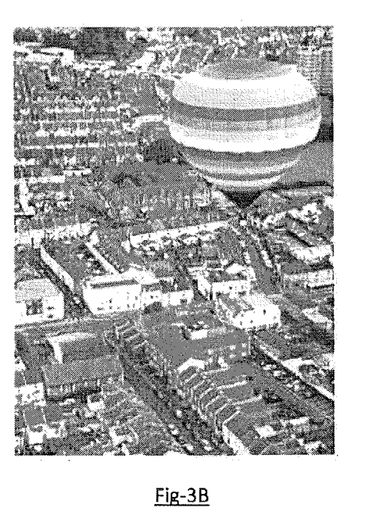
Figure 3C:
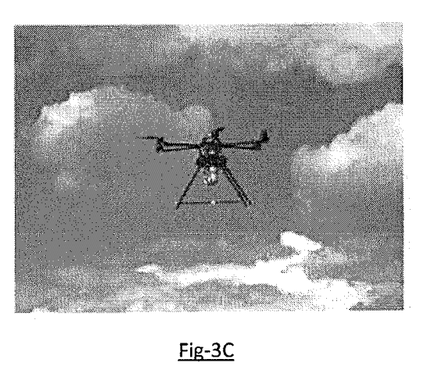

FIG. 3 illustrates some preferred embodiments of the aerial view platforms. (3A) shows a tethered unmanned blimp, and (3B) shows an unmanned tethered Balloon. These examples are stationary platforms that provide low-cost options for such aerial surveillance. Since the payload is extremely light, consisting only of remotely-controlled video equipment, the aerial platforms can be very small and inexpensive. Power requirements for the operation of the video equipment are also low and can easily be delivered through the tethering cable. (3C) is an un-tethered remotely piloted aerial vehicle that can be positioned by the proposed solution over identified spots in order to provide more "focussed" inputs that furnish more details.

Figure 4:
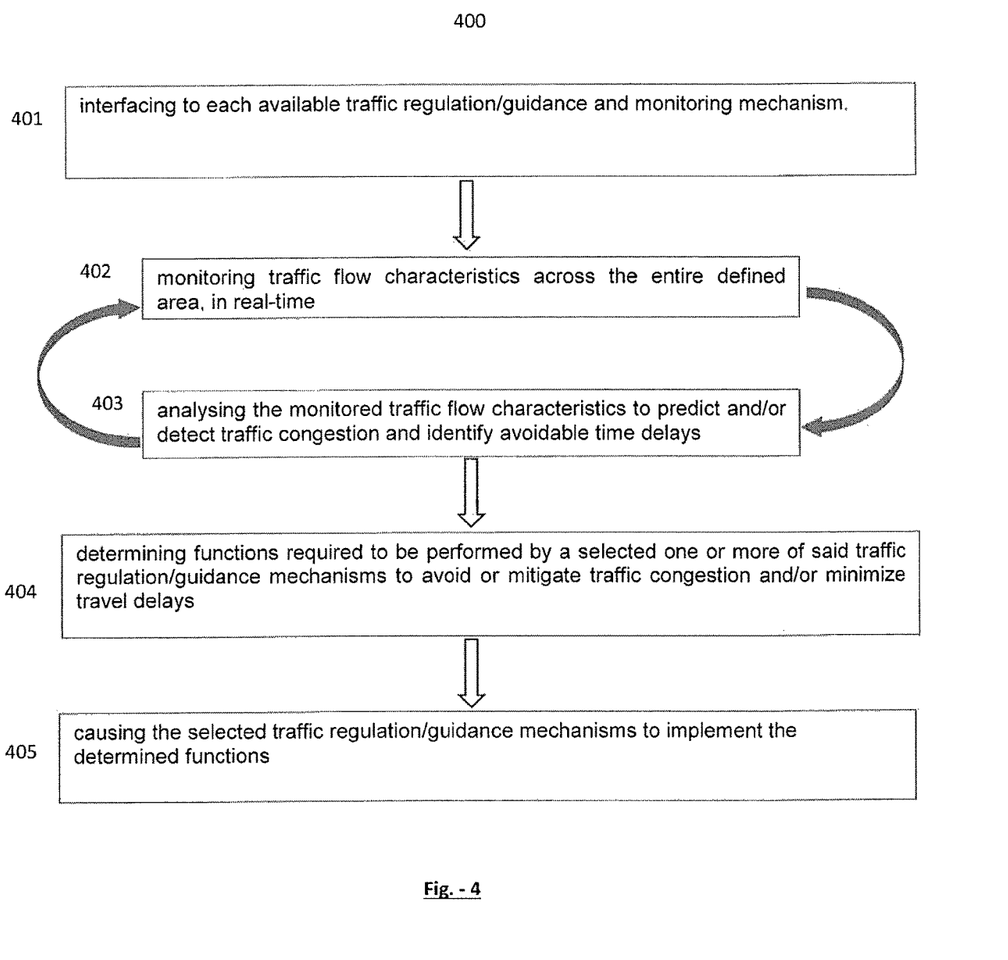
FIG. 4 depicts the steps of the method of traffic control described by the disclosure.

FIG. 4 provides a flow-chart that explains the functioning of the proposed solution. The operation is initialized at (401) by collecting information that identifies the location, operational characteristics and control interface of each available traffic regulation, traffic guidance and traffic monitoring mechanism. The activity is performed initially at the time of the commissioning of the system and later whenever facilities are updated. Existing mechanisms are retrofitted with appropriate interfaces that are compatible with the upper control layer introduced by the new system. New monitoring mechanisms are introduced to augment and overcome the limitations of the existing mechanisms. The new mechanisms also interface to the upper control layer. The system then continuously monitors traffic flow characteristics across the entire defined area, in real-time (402) and analyses the monitored traffic flow characteristics to predict and/or detect traffic congestion (403). The monitoring is performed with the help of all the available traffic monitoring mechanisms that were interfaced to in (401). The analysis is performed on the monitored data to determine the locations, nature and causes of potential and existing traffic congestion. The analysis also identifies critical areas requiring greater attention in order to optimize the deployment and functioning of the monitoring mechanisms. These findings are used for determining functions required to be performed by selected traffic regulation mechanisms, and traffic guidance mechanisms to avoid or mitigate traffic congestion and/or minimize travel delays (404). These actions are then implemented by using the interfaces of the available traffic regulation mechanisms, traffic guidance mechanisms and traffic monitoring mechanisms to cause each of them to perform the determined functions (405).

Figure 5:
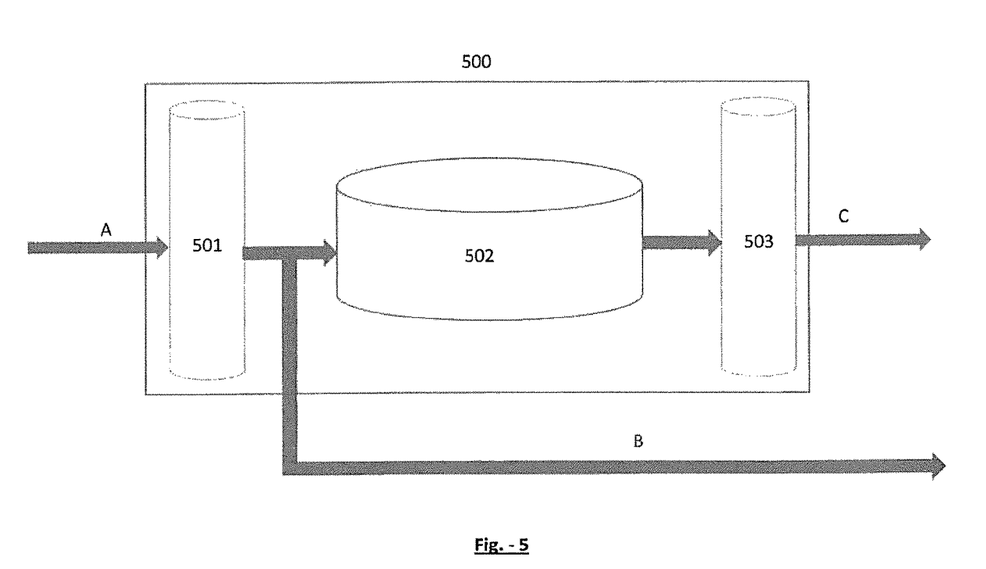
FIG. 5 depicts the block diagram of the traffic control system in accordance with the disclosure.

FIG. 5 gives the top-level block diagram of the structure of the new control element which interfaces to the available traffic monitoring, traffic regulating and traffic guidance resources to implement the proposed solution. A set of one or more Analytical Engines (501) processes the data received from the available traffic monitoring mechanisms and identifies potential traffic congestions as well as existing traffic congestions as well as the causes of just congestions. The data provided by the monitoring mechanisms is analyzed to recognize the nature, intensity, location and causes of any traffic congestion that may be identified as existing or emerging or likely. The analysis utilizes both formal and heuristic techniques and incorporates self-learning Artificial Intelligence methodologies such as Reinforced Learning. The primary approach is to detect and predict global and local traffic flow patterns within the context and implications of the identified vehicle mix and distribution. In particular, vehicle trajectory information in terms of both aggregate and selected vehicle/vehicle groups (such as vehicle platoons) is evaluated for potential or existing traffic congestion impact. External factors including weather conditions, scheduled and unexpected events such as vehicle breakdowns, road repair work, land-slides that are recognized as significant contributors to traffic conditions, are also incorporated into the analysis.

In order to perform its functions, the Analytical Engine (501) may dynamically configure or move those monitoring mechanisms that are capable of being configured or moved. A set of one or more Evaluation engines (502) analyses the identified congestion characteristics as well as causes of congestion to determine the actions required to resolve them as efficiently as possible. The actions that are defined in this manner are then communicated to the Supervisory Mechanism (503) which translates each of them into a sequence of inputs for each target traffic regulating mechanism, in accordance with the appropriate interface requirements.

Each of the Analytical Engines (501), Evaluation Engines (502) and Supervisory Mechanism (503) may employ known Artificial Intelligence based technologies including, but not limited to, Reinforced Learning techniques, Genetic programming, besides various Heuristic methods. Analytical Engines (501) receive real-time traffic monitoring data (A) from monitoring mechanisms deployed across the defined area. Those monitoring mechanisms that are controllable receive control inputs (B) for optimizing their operation. The Analytical engines (501) analyze the received data (A) and predict possible traffic congestion locations and causes and detect existing traffic congestion phenomena and associated causes. This data is fed to Evaluation Engines (502) which determine the corrective actions required to be implemented by the most appropriate selected from the available population of traffic regulating/guiding mechanisms based on their capabilities and location. The results of the determination are communicated to Supervisory Mechanism (503) for providing to the selected mechanisms (C) using the individual interfaces available for this purpose.

Figure 6:
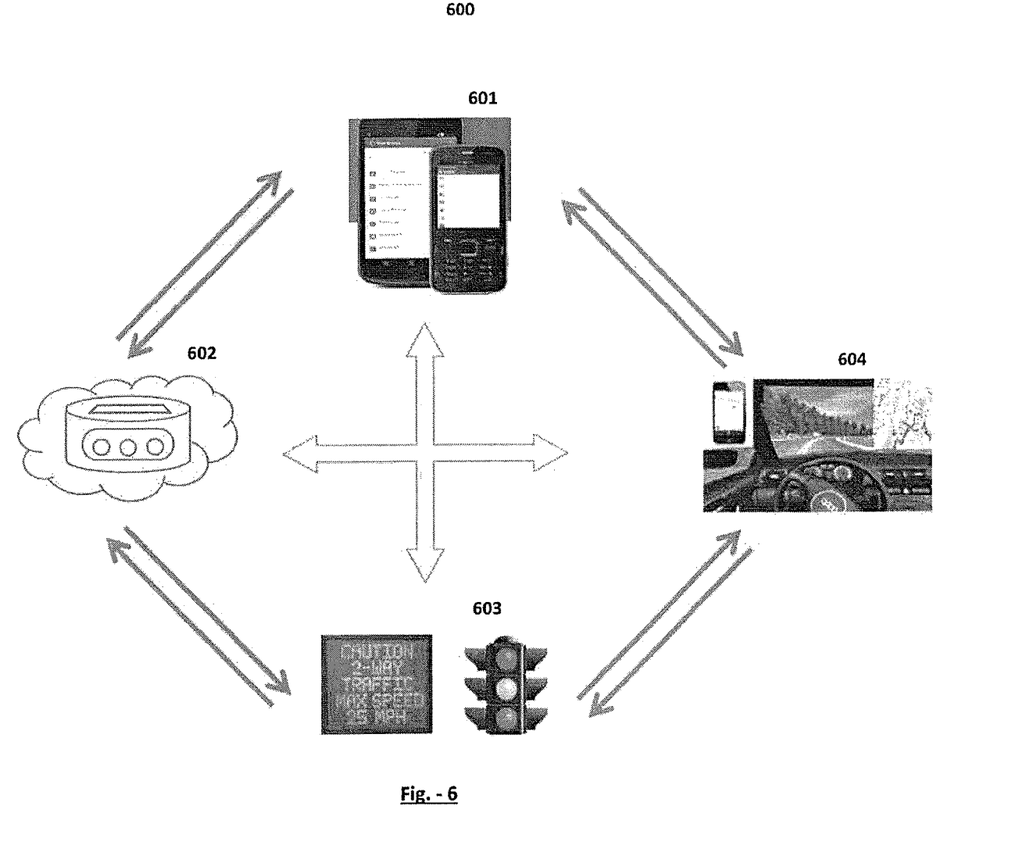
FIG. 6 depicts a block diagram of the user facility provided by the disclosure

FIG. 6 shows the basic arrangement of a facility of optimized travel planning and route guidance provided by the system to users who register to receive such a service. A smartphone application (601) supplied to the user is used to upload a set of requirements to the system (602). These requirements specify details of the journeys for which the travel planning and route guidance service is desired. Such parameters can include source and destination details, preferred dates/days and times for starting the journey, constraints on arrival times at the destination, optimization requirements—shortest journey duration, minimum fuel consumption, etc. The system (602) is aware of the available journey routes, traffic congestion patterns, and relevant external factors and obtains the current status of all traffic regulation/guidance systems (603) along each possible route. It then analyses all the available options dynamically in terms of the desired optimization criteria and provides instructions to the user through the application and/or through in-vehicle systems (604).

The solution described in this disclosure is designed to be flexible enough to work in combination with any traffic control systems and facilities that are currently operating within the defined area. Such installations need not be replaced to obtain the benefits of the new system. All that is needed is the precise definition of the capabilities, limitations and mode of operation of the existing system as well as the availability/retrofitting of an interface that enables interaction with the control element(s) to influence the behavior of the existing system in a desired manner. Consequently, the strengths and advantages of the large installed base of SCOOT, SCATS, MOVA, UTOPIA and other solutions can be effectively utilized cost-effectively.

At the same time, the proposed solution also deploys additional monitoring devices/mechanisms that augment the capabilities of the system and overcome the existing limitations. The proposed solution implements an upper layer structure that provides a synergistic operation of the existing and new resources and devices which results in an optimally effective result.

The locations, capabilities and limitations of the installed base of traffic control systems operating within the area are identified as also the capabilities of other available devices that may be deployed. The proposed solution functionally couples to each of the identified mechanisms/devices through suitable interfaces that are available or created. These interfaces can be implemented in terms of hardware or software, or any combination thereof, and enable exchange of information and instructions.

What is claimed is:

1. A method of optimizing vehicular traffic across a defined area comprising the steps of:
    interfacing to each available traffic regulation/guidance and monitoring mechanism;
    monitoring traffic flow characteristics across the entire defined area, in real-time;
    analyzing the monitored traffic flow characteristics to predict and/or detect traffic congestion and identify avoidable time delays;
    determining functions required to be performed by a selected one or more of said traffic regulation/guidance mechanisms to avoid or mitigate traffic congestion and/or minimize travel delays; and
    causing the selected traffic regulation/guidance mechanisms to implement the determined functions,
    wherein said monitoring traffic flow characteristics comprises physically positioning one or more dynamically relocate-able traffic sensing mechanisms.

2. The method as claimed in claim 1, wherein the interfacing to available traffic regulation/guidance and monitoring mechanisms comprises operatively coupling to each accessible existing mechanism as well as every new mechanism provided for use based on its location, and operational specifications.

3. The method as claimed in claim 2, wherein the interfacing to a traffic monitoring mechanism comprises an arrangement to obtain real-time traffic data from it and the ability to define its operational parameters wherever possible, and in the case of a traffic control/guidance mechanism comprises the arrangement to cause it to perform any function within its capabilities.

4. The method as claimed in claim 1, wherein the monitoring of traffic flow characteristics comprises the dynamic selection, deployment and obtaining of real-time data from the available monitoring mechanisms.

5. The method as claimed in claim 1, wherein the analysis of monitored traffic flow characteristics comprises processing the monitored flow characteristics using a combination of one or more known and/or heuristic and/or artificial intelligence techniques including reinforced learning, to detect and predict traffic congestion and avoidable time delays.

6. The method as claimed in claim 1, wherein the determining functions required to be performed is achieved by applying a combination of one or more known and/or heuristic and/or artificial intelligence techniques including reinforced learning to identify the actions required to prevent the occurrence of predicted traffic congestion as well as the corrective measures needed to minimize the impact of detected traffic congestion and avoid time delays.

7. The method as claimed in claim 1, wherein the causing selected traffic regulation/guidance mechanisms by defining and issuing control signals to each such mechanism/device in accordance with the identified individual operational characteristics and capabilities, in a manner that causes implementation of the determined function.

8. The method as claimed in claim 1, wherein the monitoring of traffic flow characteristics comprises analysis of real-time video from a set of one or more platforms located and equipped to provide continuous and unobstructed views of all vehicles in the entire assigned area.

9. The method as claimed in claim 8, wherein the location of the platform is at a height that avoids the shadowing effect of large vehicles on smaller vehicles and adjustable zoom capabilities in the video capture devices enable clear identification of global and selected vehicle trajectories.

10. The method as claimed in claim 1, wherein said monitoring includes:
   destination parameters and journey requirements from one or more vehicles that elect to register for guidance services;
   incorporating the destination parameters and journey requirements into the analyzing process;
   tracking the location and trajectory of each registered vehicle present in the monitored traffic flow; and
   guiding each said registered vehicle in scheduling its journey and reaching its destination in accordance with the requirements.

11. The method as claimed in claim 1, wherein the analysis of traffic flow characteristics incorporates the additional requirements imposed by expected/unexpected weather conditions, repair/construction work, natural emergencies, social events as well as other occurrences requiring the priority movement of specified vehicles.

12. The method as claimed in claim 11, wherein the additional requirements include travel planning and route guidance of vehicles that have registered to receive such a service and have parameters and requirements for their travel which are specified explicitly or are derived from observed patterns of past journeys.

13. A vehicular traffic management system for a defined area comprising:
   one or more monitoring mechanisms providing real-time data of traffic flow characteristics across the entire defined area;
   one or more traffic regulating/guiding mechanisms each with a defined interface for invoking any or more of a defined set of functional capabilities positioned at known locations in the defined area;
   a set of one or more analytical engines configured to predict and/or detect traffic congestion and traffic delays based on real time data obtained from each of the monitoring mechanisms;
   a set of one or more evaluation engines configured to determine functions required to be performed by a selected one or more of the available traffic regulating/guiding mechanisms in the defined area to avoid or mitigate the predicted and/or detected traffic congestion and to minimize travel delays; and
   a supervisory mechanism that operates the defined interface of each of the selected traffic regulating/guiding mechanisms and causes them to implement the determined functions,
   wherein the traffic regulating mechanisms include one or more vehicle-actuated isolated junction systems.

14. The vehicular traffic management system as claimed in claim 13, wherein the monitoring mechanisms include crowd-sourced vehicle location and movement data obtained from a plurality of vehicles in the defined area.

15. The vehicular traffic management system as claimed in claim 13, wherein the monitoring mechanisms include one or more tethered or moveable aerial platforms capable of providing real-time images and/or video of one or more regions in the defined area.

16. The vehicular traffic management system as claimed in claim 15, wherein one or more of the tethered or moveable aerial platforms are controllable in terms of the image capture and/or video functions.

17. The vehicular traffic management system as claimed in claim 15, wherein one or more of the moveable aerial platforms are controllable in terms of position as well as image capture and/or video streaming functions.

18. The vehicular traffic management system as claimed in claim 13, wherein one or more of the analytical engines utilize heuristic techniques and/or one or more of the known artificial intelligence methods, including Reinforced Learning.

19. The vehicular traffic management system as claimed in claim 13, wherein one or more of the evaluation engines employ one or more of the known artificial intelligence methods, including Reinforced Learning.

20. The vehicular traffic management system as claimed in claim 13, wherein one or more of the analytical engines and/or evaluation engines and/or supervisory mechanisms are implemented as distributed systems.

21. A vehicular traffic management system for a defined area comprising:
   one or more monitoring mechanisms providing real-time data of traffic flow characteristics across the entire defined area;
   one or more traffic regulating/guiding mechanisms each with a defined interface for invoking any or more of a defined set of functional capabilities positioned at known locations in the defined area;
   a set of one or more analytical engines configured to predict and/or detect traffic congestion and traffic delays based on real time data obtained from each of the monitoring mechanisms;
   a set of one or more evaluation engines configured to determine functions required to be performed by a selected one or more of the available traffic regulating/guiding mechanisms in the defined area to avoid or mitigate the predicted and/or detected traffic congestion and to minimize travel delays; and
   a supervisory mechanism that operates the defined interface of each of the selected traffic regulating/guiding mechanisms and causes them to implement the determined functions, wherein the traffic regulating mechanisms include one or more vehicle-actuated coordinated junction systems.

* * * * *